United States Patent [19]

Sudo

[11] 4,251,197
[45] Feb. 17, 1981

[54] STRETCHING APPARATUS OF A FLATTENED CYLINDRICAL FILM

[76] Inventor: Michio Sudo, c/o Nikko Resin Co., Ltd., Fujikoshi Bldg., No. 23-7, Higashi Gotanda 5-chome, Shinagawa-ku, Tokyo, Japan

[21] Appl. No.: 75,039

[22] Filed: Sep. 12, 1979

[51] Int. Cl.³ .............................. B29D 7/24
[52] U.S. Cl. ........................ 425/393; 156/494; 264/565; 425/403
[58] Field of Search ............ 425/403, 404, 393; 264/290.2, 288.4, 563, 173, 564–566, 567; 156/494

[56] References Cited

U.S. PATENT DOCUMENTS

| | | | |
|---|---|---|---|
| 3,065,097 | 11/1962 | Zupic et al. | 425/404 |
| 3,437,537 | 4/1969 | Takada | 264/563 |
| 3,608,019 | 9/1971 | Kawasaki et al. | 264/290.2 |
| 3,894,907 | 7/1975 | Sudo | 264/290.2 |

Primary Examiner—Jeffery R. Thurlow
Attorney, Agent, or Firm—Thomas R. Morrison

[57] ABSTRACT

This invention relates to a stretching apparatus of a flattened cylindrical film consisting of one or more layers of thermoplastic resin. The stretching apparatus has a heavy mandrel for heating and stretching a film. Due to suspending means suspending the heavy mandrel the cylindrical film of one or more layers is stretched smoothly without shaking, thereby a uniformly flattened, thin, strong cylindrical film is obtained.

2 Claims, 7 Drawing Figures

STRETCHING APPARATUS OF A FLATTENED CYLINDRICAL FILM

BACKGROUND OF THE INVENTION

The present invention relates to stretching apparatus for flattened cylindrical film consisting of one or more layers of thermoplastic resin, in which a weighty suspended object such as a mandrel or the like is firmly fixed within one or more cylindrical layers.

In the stretching apparatus of a flattened cylindrical film, it is very important to prevent shaking of the weighty suspended object such as a mandrel or the like which is suspended within one or more cylindrical layers. Unless the weighty suspended object such as a mandrel or the like is firmly fixed therewithin, a film of uniformly flattened cylindrical shape cannot be obtained. According to a conventional art, means for fixing the mandrel are insufficient, and in addition, it is also insufficient to prevent loading of the mandrel.

Therefore, it is impossible to suspend a large-sized mandrel or the like, and stretching of a large-sized flattened cylindrical film is difficult to accomplish. In view of the above disadvantage of the conventional art, the present invention has been attained.

BRIEF SUMMARY OF THE INVENTION

It is a general object of this invention to provide a stretching apparatus of a flattened cylindrical film consisting of one or more layers of thermoplastic resin which can be stretched smoothly by preventing shaking of a weighty suspending object such as a mandrel or the like fixed therewithin, thus the formability of a flattened cylindrical film is remarkably improved.

It is another object of this invention to provide a stretching apparatus of a flattened cylindrical film to which excessive load is not applied since the load of the mandrel is dispersed to both a lower suspending means and an upper suspending means.

It is another object of this invention to provide a stretching apparatus of a flattened cylindrical film in which it is possible to make the mandrel bigger, more easily stretching a flattened cylindrical film a larger diameter.

Other and further objects, features and advantages of the invention will appear more fully from the following description.

BRIEF DESCRIPTION OF THE ACCOMPANYING DRAWINGS

PREFERRED EMBODIMENTS OF THE INVENTION

Preferred embodiments of this invention will now be described with reference to the accompanying drawings.

Figure 1:
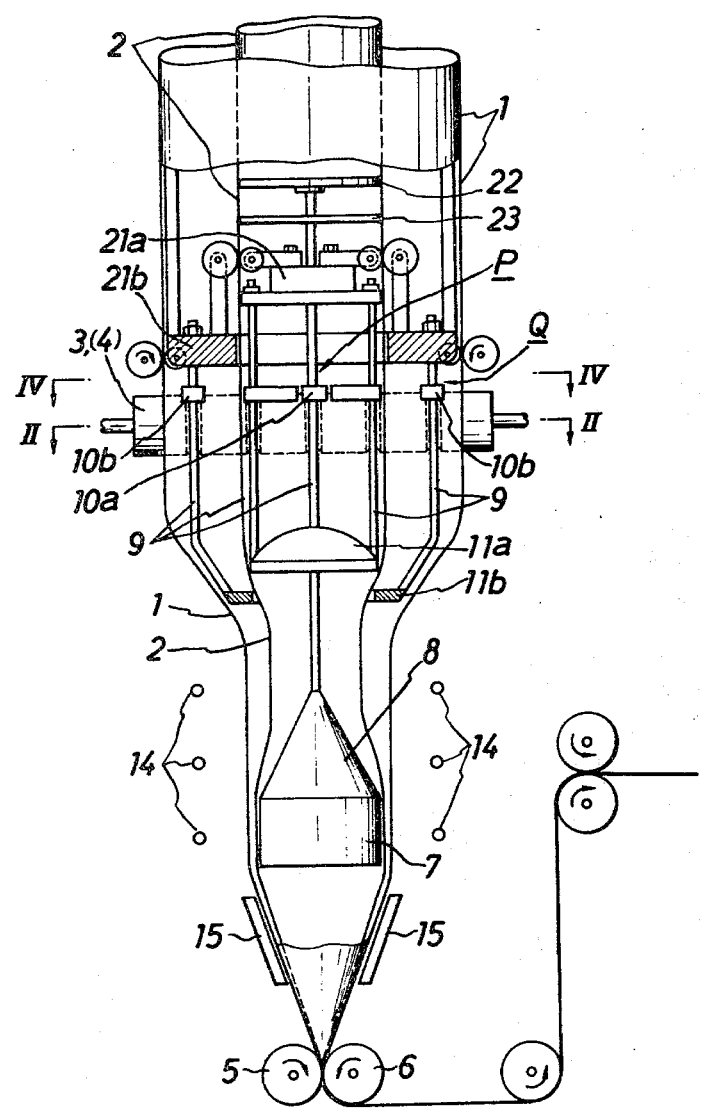
FIG. 1 is an overall view of an embodiment of a stretching apparatus of a flattened cylindrical film according to this invention.
Figure 2:
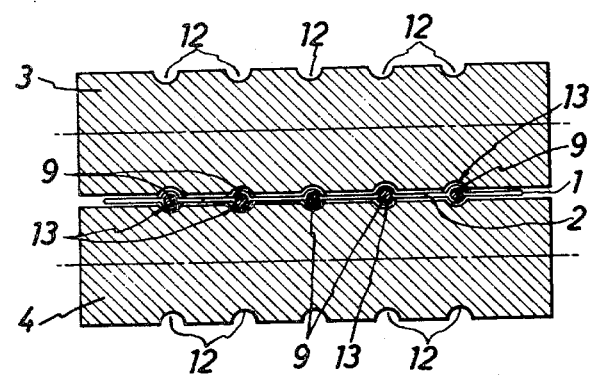
FIG. 2 is an enlarged section view of the nip rolls taken on line II—II of FIG. 1.

Referring first to FIG. 1, an outer flattened cylindrical film 1 and an inner flattened cylindrical film 2 are supported by a pair of nip rolls 3, 4 in which the former is stretched lengthwisely by an enlarged ring 11b, while the latter is stretched crosswisely by a sloping wall 8 of a cone-shape mandrel 7 having heating means. The outer cylindrical film 1 is heated by heating means 14, then united with the crosswisely stretched inner cylindrical film 2 which is heated by the mandrel 7, and finally both the outer and inner films 1, 2 are united into one cylindrical flattened film due to a quenching effect of cooling means 15. The united cylindrical film is fed to a final processing by way of a pair of the lowermost nip rolls 5, 6. Thus, a thin, strong and uniformly flattened cylindrical film is obtained. For example, it can be employed for making a strong bag for packing heavy materials.

The mandrel 7 is suspended by a roller 10a rotatably mounted upon a pair of upper nip rolls 3, 4 by way of a center suspending rod 9. The center rod 9 which is fixed with the top of the cone-shape mandrel 7 is provided with a ring 11a for stretching the inner film 2, passed through a circular path 13 which is formed by two semicircular grooves 12, 12 of the respective rolls 3,4 which are facing each other and fixed by the rolls 10a rotatably mounted upon a pair of nip rolls 3, 4. This structure is an inner suspending means P.

The enlarged ring 11b for stretching the outer film 1 is supported at two sides by two suspending rods 9, 9, and the latter are fixed with the rolls 10b, 10b rotatably mounted upon a pair of nip rolls 3, 4. This structure is an outer suspending means Q.

Numeral 14 is heating means which surround the outer film 1 stretched lengthwisely between the mandrel 7 and the nip rolls 3, 4.

Numeral 15 is cooling means for cooling a united film of the two films 1, 2, the cooling means being disposed below the mandrel so as to surround the united film. It provides quenching as a finishing process of the united cylindrical film by water jetting.

The mounting rolls 10a, 10b suspending the mandrel 7 and the enlarged ring 11b are mounted rotatably upon the nip rolls 3, 4, each of the mounting rolls 10a, 10b comprising two pairs of rubber rolls 16, a receiving plate 17 in which is perforated a passage for inserting the rod 9, two bearing pins 18, 18 for supporting the rubber rolls 16 and the receiving plate 17, and two side support 19, 19. (Refer to FIG. 4) The top of the mounting rolls 10a is fixed with a rod 20 fixed with a supporting plate 21a as shown in FIG. 3A.

Figure 3A:
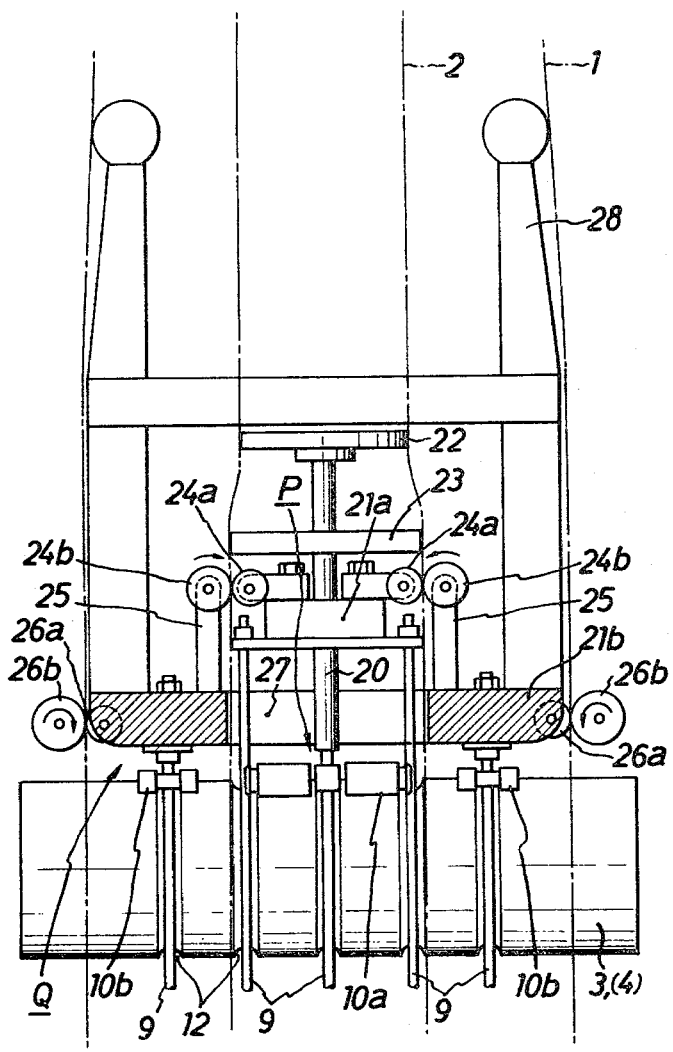
FIG. 3A is a partially sectional front view showing a main part of FIG. 1.
Figure 3B:
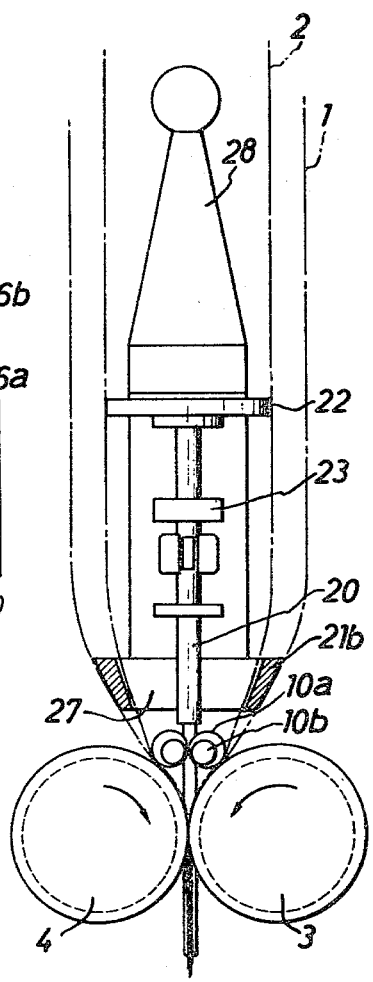
FIG. 3B is a side view of FIG. 3A.
Figure 4:
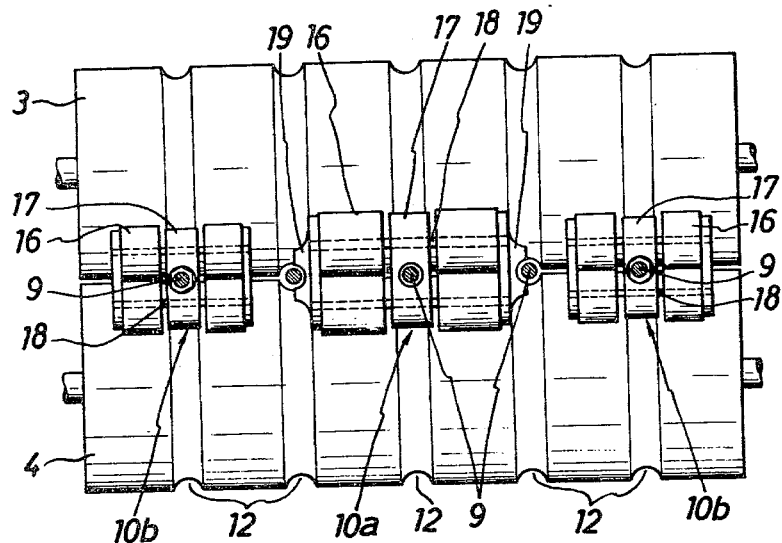
FIG. 4 is an enlarged section view taken on line IV—IV of FIG. 1.

Further, above the supporting plate 21a, a lower guiding plate 23 and an upper cylindrical guiding disc 22 for guiding the inner film 2 are fixed with the rod 20 (as shown in FIG. 3A). There is formed an opening 27 above the mounting rolls 10a so that the inner film 2 can be stretched freely. The mounting rolls 10b, 10b are, by way of the rods 9, fixed with respective regulating plates 21b, 21b each of which is provided at one end a vertical member 25 having a roll 24b. The roll 24b is rotatably engaged with the roll 24a for preventing shaking of the inner film 2. The inner film 2 is, therefore, stretched downwardly between the rolls 24a, 24b. Further, each regulating plate 21b incorporates a roll 26a in an outer corner thereof. The incorporated roll 26a for preventing shaking of the outer film 1 is rotatably engaged with an outermost roll 26b which is fixed with preferred means (not illustrated in the drawings) outside the stretching apparatus. The outer film 1 is, therefore, stretched lengthwisely between the rolls 26a, 26b. The rolls 24a, 24b as well as the rolls 26a, 26b can be coaxially engaged with each other.

Thus, left-to-right or right-to-left shaking (or vibration) of the inner suspending means P and of the two outer suspending means Q is always prevented. Accordingly, both the inner and outer films are always stretched smoothly without injury the surfaces thereof. Finally, both the films which are flattened uniformly are united into one, thereby a thin, strong cylindrical film being formed.

Another embodiment of FIG. 5 will now be described.

In this embodiment the underside of the mandrel 7 is connected with a lowermost rod 29, the end of the lowermost rod 29 comprising a pair of nip rolls 5, 6. Thus, the united film is stretched between a pair of nip rolls 30, 31 and a pair of the lowermost nip rolls 5, 6. This is different from the embodiment disclosed in FIGS. 1 to 4. The other structure is the same as the example of FIG. 1.

Figure 5:
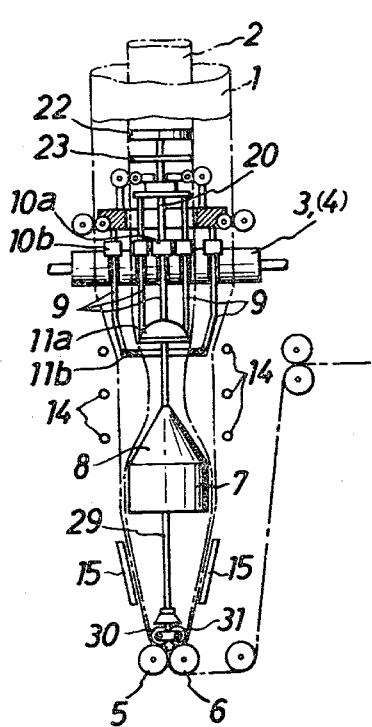
FIG. 5 is an overall view of another embodiment according to this invention, in which an additional means for supporting the mandrel is mounted therebelow.

In the embodiment of FIG. 5, the load of the internal suspending means P which suspends a heavy mandrel 7 is mainly applied to a pair of the lowermost nip rills 5, 6 by way of a pair of rolls 30, 31 supporting the load, but applied a little to the nip rolls 3, 4. Thus, the load of the mandrel 7 is dispersed to the inner suspending means P at the upper position and the lower suspending means consisting of the rod 39 and a pair of nip rolls 30, 31. As a result, it becomes possible to mount a large sized mandrel in the stretching apparatus.

In the above embodiments a case of two layered films i.e. an inner film and an outer film is described. Likewise, stretching of one layer film or two or more layered films is also possible.

Figure 6:
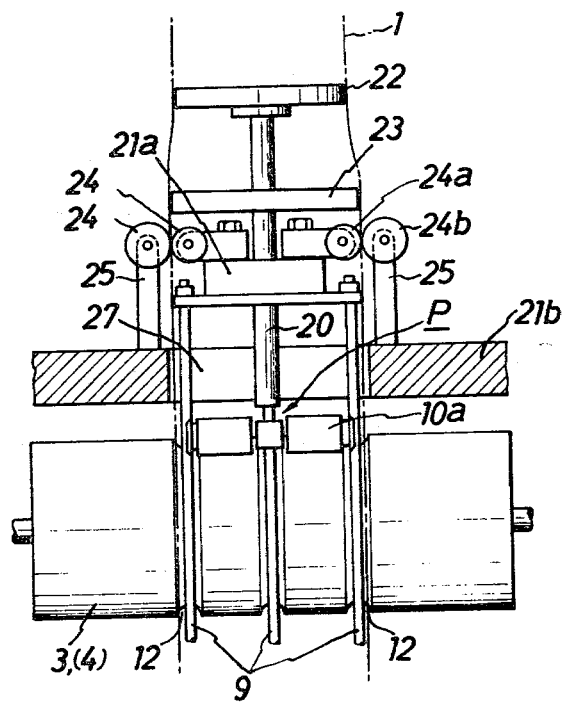
FIG. 6 is a partially sectional front view of another embodiment according to this invention, in which only one flattened cylindrical film is stretched.

The embodiment of FIG. 6 relates to a stretching apparatus of one layer film 1. The film is firmly secured by the suspending means P which suspend the heavy mandrel or the like. Therefore, a right-to-left shaking of the suspending means P is avoided, thereby a uniformly flattened film being obtained.

What is claimed is:

1. A stretching apparatus for stretching flattened cylindrical film having at least one cylindrical layer of thermoplastic resin comprising:

at least first and second opposed nip rolls in opposed contact with the outside of said flattened cylindrical film;
at least first and second supporting rollers inside said flattened cylindrical film bearing on, and being supported by, said first and second nip rolls through said at least one cylindrical layer;
a heavy stretching means inside said cylindrical film;
means for suspending said stretching means below said at least first and second nip rolls from said at least first and second supporting rollers;
at least first and second stabilizing rollers bearing against opposed inside surfaces of said at least one cylindrical layer;
means attached to said at least first and second supporting rollers for supporting said at least first and second stabilizing rollers above said at least first and second nip rolls;
at least a third stabilizing roller outside said at least one cylindrical layer aligned with, and bearing against, said first stabilizing roller through said at least one cylindrical layer;
at least a fourth stabilizing roller outside said at least one cylindrical layer aligned with, and bearing against, said second stabilizing roller through said at least one cylindrical layer; and
said first, second, third and fourth stabilizing rollers being effective to stabilize said heavy stretching means against vibration due to side-to-side shaking of said at least first and second supporting rollers.

2. A stretching apparatus for stretching flattened cylindrical film according to claim 1 wherein said at least one cylindrical layer includes a first cylindrical layer inside a second cylindrical layer, said first and second and said third and fourth stabilizing rollers being in opposed contact with said cylindrical layer;
and further comprising at least fifth and sixth stabilizing rollers bearing against opposed inside surfaces of said first cylindrical layer;
means attached to said first and second supporting rollers for supporting said at least fifth and sixth stabilizing rollers above said at least first and second nip rolls;
at least a seventh stabilizing roller outside said first cylindrical layer aligned with, and bearing against, said fifth stabilizing roller through said first cylindrical layer;
at least an eighth stabilizing roller outside said first cylindrical layer aligned with, and bearing against, said sixth stabilizing roller through said first cylindrical layer; and
said first, second, seventh and eighth stabilizing rollers being fixedly disposed relative to each other whereby said stretching means is stabilized.

* * * * *